United States Patent [19]

Kuroda

[11] 3,979,233

[45] Sept. 7, 1976

[54] MAGNETIC NI-CR-MN-GE-FE ALLOY

[75] Inventor: Nobukazu Kuroda, Yokohama, Japan

[73] Assignee: Sony Corporation, Tokyo, Japan

[22] Filed: Jan. 28, 1975

[21] Appl. No.: 544,674

Related U.S. Application Data

[63] Continuation-in-part of Ser. No. 480,116, June 17, 1974.

[30] Foreign Application Priority Data

Feb. 5, 1974 Japan ............................... 49-14747

[52] U.S. Cl. ............................... 148/31.55; 75/170; 75/171; 148/120

[51] Int. Cl.$^2$ .................... C04B 35/00; C22C 19/05

[58] Field of Search ................. 148/31.55, 120, 121; 75/171, 170

[56] References Cited

UNITED STATES PATENTS

| | | | |
|---|---|---|---|
| 3,264,100 | 8/1966 | Ichinose et al. | 75/170 |
| 3,582,408 | 6/1971 | Onyshkevych | 148/31.55 |
| 3,794,530 | 2/1974 | Masumoto et al. | 148/31.55 |
| 3,837,933 | 9/1974 | Masumoto et al. | 148/31.55 |

FOREIGN PATENTS OR APPLICATIONS

| | | | |
|---|---|---|---|
| 4,633,381 | 9/1971 | Japan | 148/31.55 |
| 1,086,674 | 10/1967 | United Kingdom | 148/31.55 |

*Primary Examiner*—Walter R. Satterfield
*Attorney, Agent, or Firm*—Hill, Gross, Simpson, Van Santen, Steadman, Chiara & Simpson

[57] ABSTRACT

An iron-nickel magnetic alloy is disclosed which includes chromium, germanium and manganese.

1 Claim, 15 Drawing Figures

$Ni_{80}Fe_{15.5-\delta}Cr_4Ge_{0.5}Mn_\delta$ $Ni_{80}Fe_{15-\delta}Cr_4Ge_1Mn_\delta$ $Ni_{80}Fe_{13.5-\delta}Cr_4Ge_{2.5}Mn_\delta$ $Ni_{80}Fe_{16-\delta}Cr_4Ge_0Mn_\delta$ $Ni_{80}Fe_{14-\delta}Cr_5Ge_1Mn_\delta$ $Ni_{80}Fe_{14.5-\delta}Cr_5Ge_{0.5}Mn_\delta$

MAGNETIC NI-CR-MN-GE-FE ALLOY

CROSS-REFERENCES TO RELATED APPLICATION

This application is a continuation in part of my copending U.S. application, Ser. No. 480,116, filed June 17, 1974.

BACKGROUND OF THE INVENTION

1. Field of the Invention

This invention relates generally to a magnetic alloy, and more particularly to a soft magnetic alloy for use with a magnetic head.

2. Description of the Prior Art

Hitherto, a Permalloy which is a magnetic alloy high in permeability has been widely used as the core material of a magnetic head. The Permalloy is superior in magnetic characteristics but is bad in wear resistance. A magnetic head made of Permalloy is much abraded when used for recording and/or reproducing on and/or from a magnetic tape which used powders of chromium dioxide ($CrO_2$) as magnetic powders and has been widely used recently, so that the magnetic head can not only be used for a long time period but also is changed in electric characteristics as a magnetic head during the use.

To avoid the above defects, a magnetic alloy which is improved in wear resistance and magnetic characteristics, for example, iron-nickel alloy including niobium and tungsten or iron-nickel alloy including germanium has been proposed. However, these magnetic alloys are difficult in heat treatment or bad in magnetic characteristics and wear resistance.

Accordingly, such a magnetic alloy has not been used generally.

SUMMARY OF THE INVENTION

It is an object of this invention to provide a magnetic alloy which is superior in wear resistance, smaller than 0.07 Oersted in coercive force Hc, greater than 6000 Gausses in magnetic flux density $B_{10}$ ($B_{10}$ being the magnetic flux density at 10 Oe.), greater than 4000 in initial permeability $\mu_0$ and greater than 60 $\mu\Omega$-cm in specific resistance $\rho$ and which is preferred for use with the material of the core of a magnetic head.

It is another object of this invention to provide a magnetic alloy which is easily manufactured and good in rolling property.

It is a further object of this invention to provide a magnetic alloy which is preferred for use with a magnetic shielding material.

The other objects, features and advantages of this invention will become apparent from the following description taken in conjunction with the accompanying drawings.

DESCRIPTION OF THE PREFERRED EMBODIMENTS

With reference to the drawings, the static magnetic characteristics, specific resistance, hardness and wear resistance of the magnetic material according to this invention will be now described.

Figure 1:
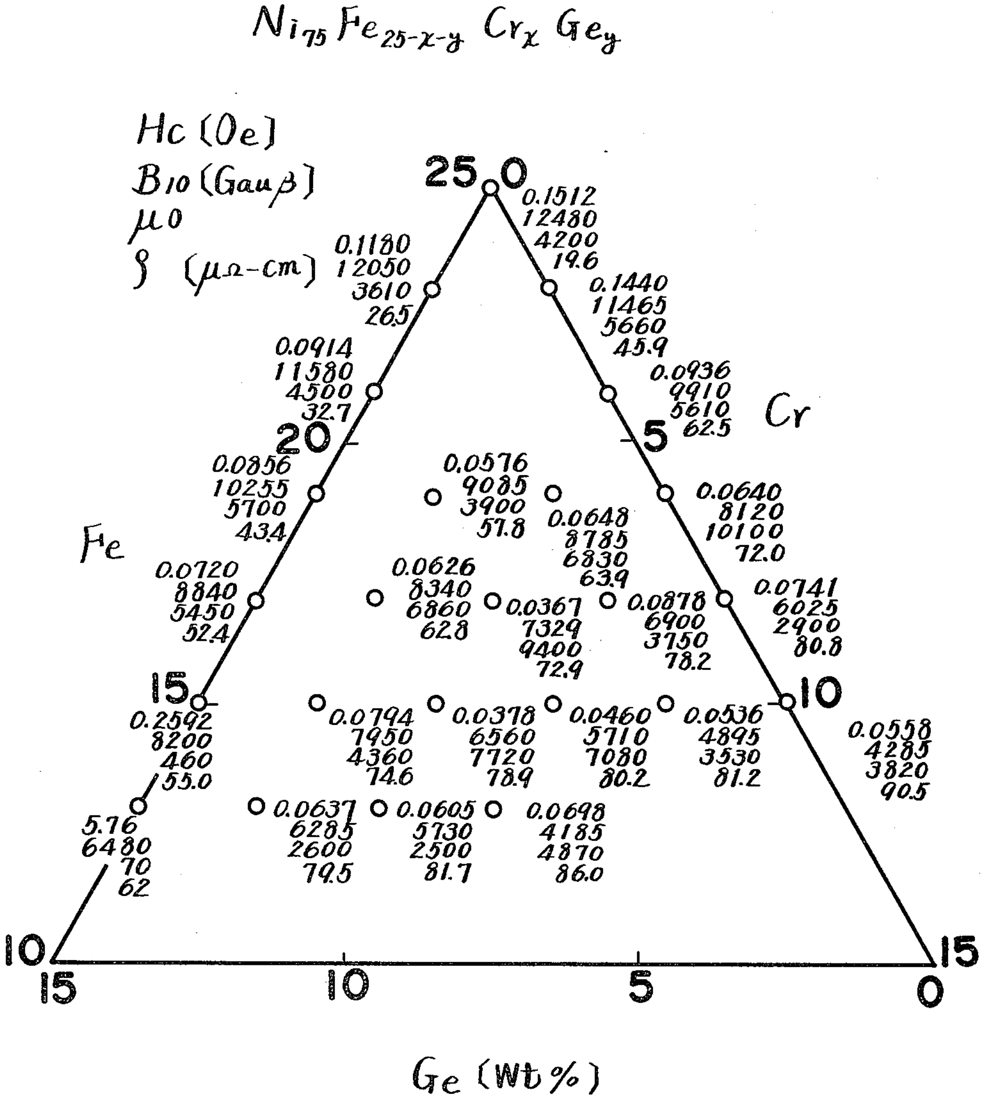
FIG. 1 is a composition diagram of a quadruple or quaternary alloy $Ni_{75}Fe_{25-x-y}Cr_xGe_y$ (cooling treatment in a furnace)
Figure 2:
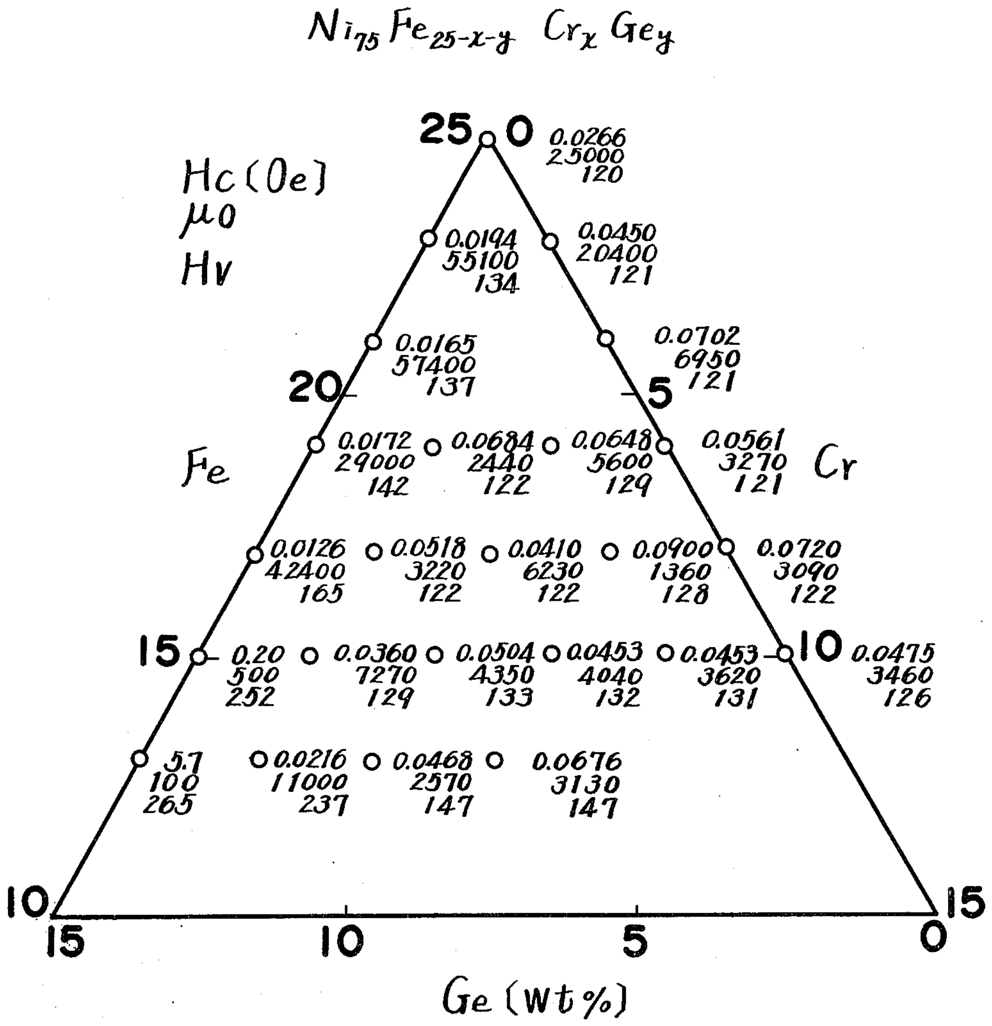
FIG. 2 is a composition diagram of a quadruple alloy $Ni_{75}Fe_{25-x-y}Cr_xGe_y$ (rapid cooling treatment)

FIG. 1 is a composition diagram showing the coercive force Hc, magnetic flux density $B_{10}$ (magnetic flux density at 10 Oersteds), initial permeability $\mu_0$ and specific resistance $\rho$ of a so-called quadruple alloy $Ni_{75}Fe_{25-x-y}Cr_xGe_y$ at the respective compositions, which is obtained by finally annealing the quadruple alloy with cooling treatment in a furnace and in which comprises 75 weight percent of nickel (Ni) constant, $x$ weight percent of chromium (Cr), $y$ weight percent of germanium (Ge) and balance iron (Fe), and FIG. 2 is a composition diagram showing the coercive force Hc, initial permeability $\mu_0$ and Vicker's hardness Hv of a similar quadruple alloy $Ni_{75}Fe_{25-x-y}Cr_xGe_y$ at the respective compositions the final annealing of which is carried out rapidly. The numerical values in FIG. 1 indicate Hc, $B_{10}$, $\mu_0$ and $\rho$, respectively, from above to below, and the numerical values in FIG. 2 Hc, $\mu_0$ and Hv, respectively, from above to below.

Figure 3:
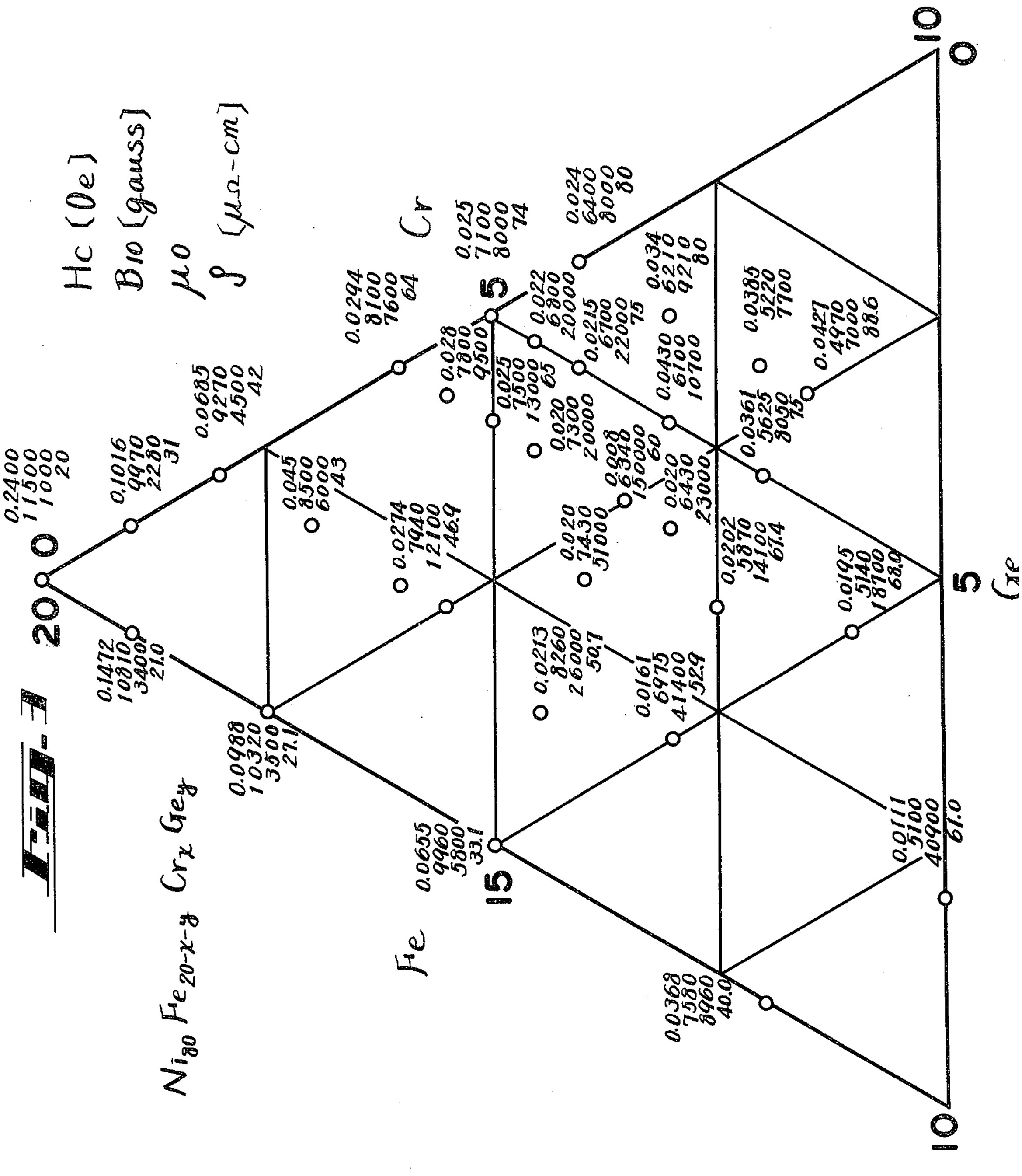
FIG. 3 is a composition diagram of a quadruple alloy $Ni_{80}Fe_{20-x-y}Cr_xGe_y$ (cooling treatment in a furnace)

FIG. 3 is a composition diagram showing the coercive force Hc, magnetic flux density $B_{10}$, initial permeability $\mu_0$ and specific resistance $\rho$ of a so-called quadruple alloy $Ni_{80}Fe_{20-x-y}Cr_xGe_y$ at the respective compositions, which is subjected to a furnace cooling treatment or cooling treatment in a furnace. The numerical values in FIG. 3 indicate Hc, $B_{10}$, $\mu_9$ and $\rho$, respectively, from above to below.

Figure 4:
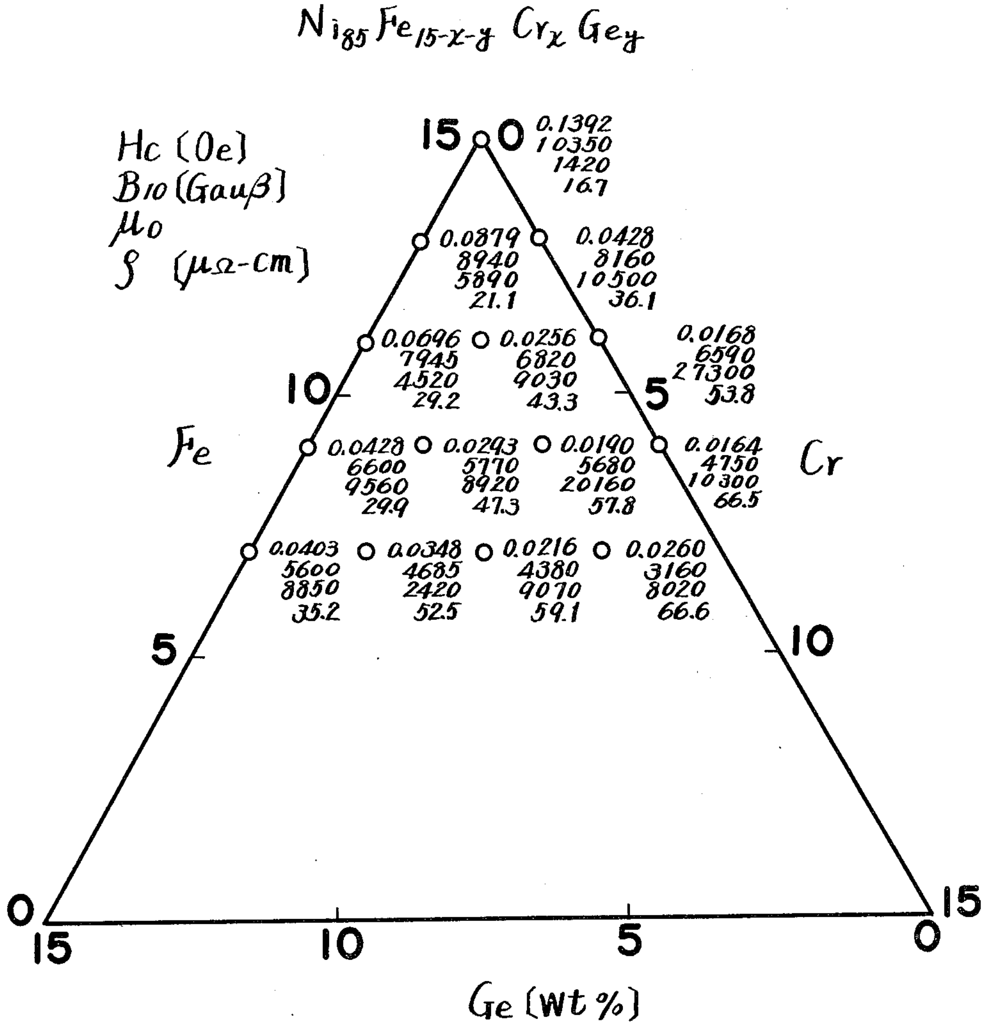
FIG. 4 is a composition diagram of a quadruple alloy $Ni_{85}Fe_{15-x-y}Ce_xGe_y$ (cooling treatment in a furnace)
Figure 5:
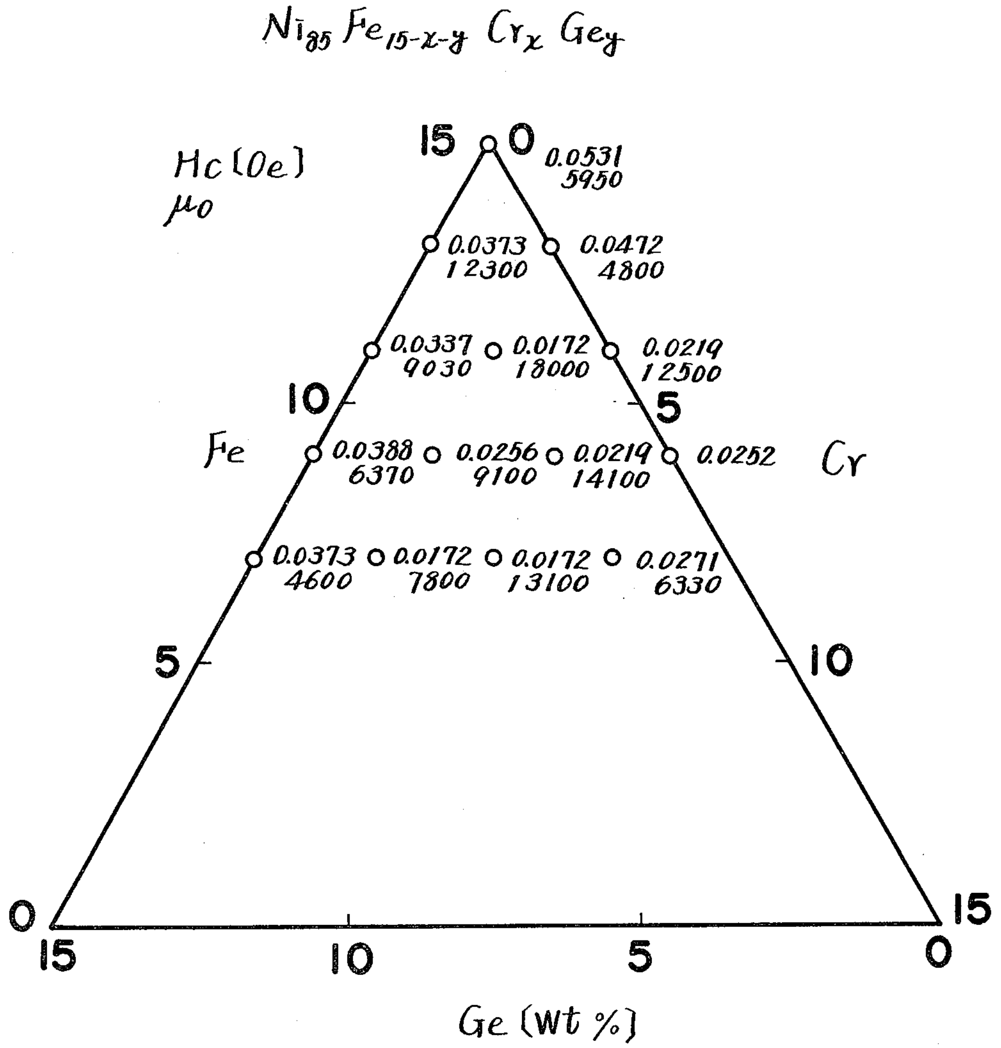
FIG. 5 is a composition diagram of a quadruple alloy $Ni_{85}Fe_{15-x-y}Cr_xGe_y$ (rapid cooling treatment)
Figure 8:
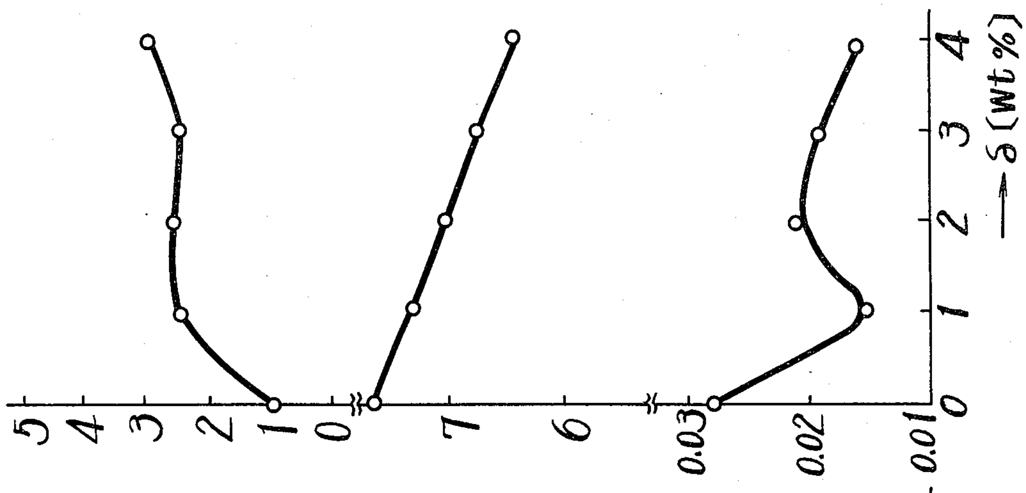
FIG. 8 is a graph showing static magnetic characteristics of a quintuple alloy $Ni_{80}Fe_{15.5-\delta}Cr_4Ge_{0.5}Mn_\delta$.
Figure 7:
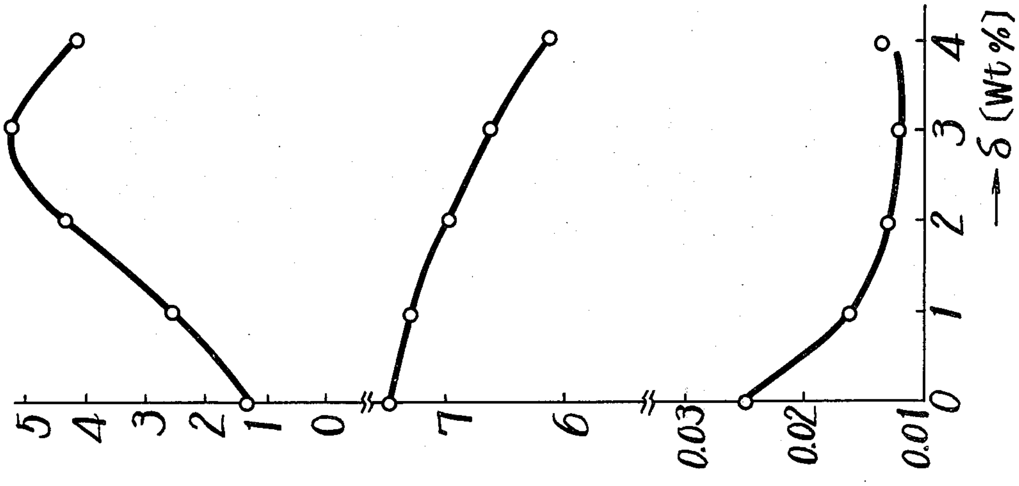
FIG. 7 is a graph showing static magnetic characteristics of a quintuple alloy $Ni_{80}Fe_{15-\delta}Cr_4Ge_1Mn_\delta$.

FIG. 4 is a composition diagram showing the coercive force Hc, magnetic flux density $B_{10}$ intial permeability $\mu_0$ and specific resistance $\rho$ of a so-called quadruple alloy $Ni_{85}Fe_{15-x-y}Cr_xGe_y$ at respective compositions, which is subjected to a furnace cooling treatment at final annealing process and which comprises 85 weight percent of Ni, constant, x weight percent of Cr, $y$ weight percent of Ge and balance Fe, respectively. FIG. 5 is a composition diagram showing the coercive force Hc and initial permeability $\mu_0$ of a similar quadruple alloy $Ni_{85}Fe_{15-x-y}Cr_xGe_y$, which is subjected to rapid cooling treatment at final annealing. The numerical values in FIG. 4 indicate Hc, $B_{10}$, $\mu_0$ and $\rho$ from above to below, and those in FIG. 5 Hc and $\mu_0$ from above to below, respectively.

Figure 6:
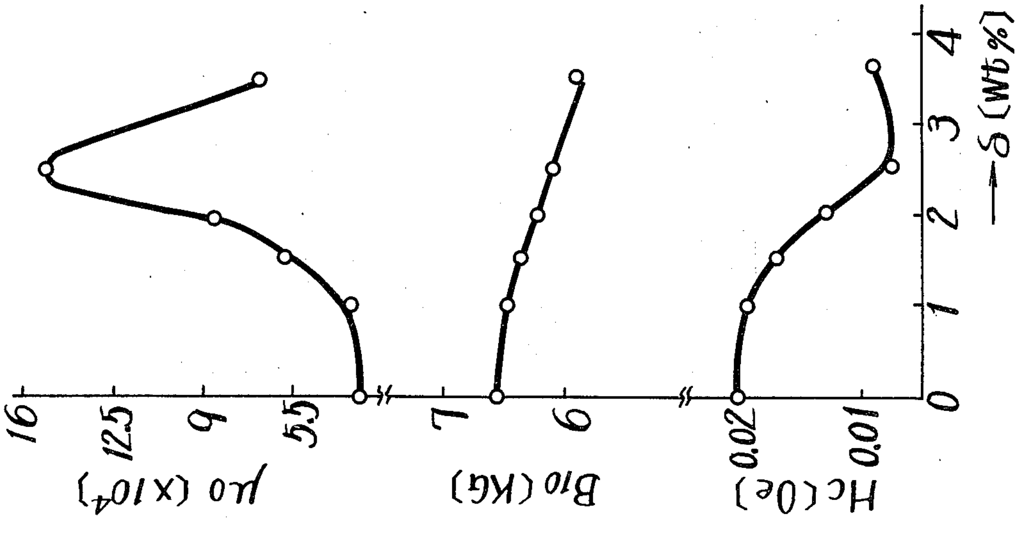
FIG. 6 is a graph showing static magnetic characteristics of a quintuple alloy $Ni_{80}Fe_{13.5-\delta}Cr_4Ge_{2.5}Mn_\delta$.

FIG. 6 is a graph showing the coercive force Hc, magnetic flux density $B_{10}$ and initial permeability $\mu_0$ of a so-called quintuple alloy $Ni_{80}Fe_{13.5-\delta}Cr_4Ge_{2.5}Mn_\delta$, at respective compositions, which comprises 80 weight percents of Ni, 4 weight percents of Cr, 2.5 weight percents of Ge (which are constant), the adding amount δ of manganese (Mn) being varied and balanced Fe, and FIGS. 7 to 10 are graphs, similar to FIG. 6, showing the coercive force Hc, magnetic flux density $B_{10}$ and initial permeability $\mu_0$ of similar quintuple alloys $Ni_{80}Fe_{15-\delta}Cr_4Ge_1Mn_\delta$, $Ni_{80}Fe_{15.5-\delta}Cr_4Ge_{0.5}Mn_\delta$, $Ni_{80}Fe_{14.5-\delta}Cr_5Ge_{0.5}Mn_\delta$, $Ni_{80}Fe_{14-\delta}Cr_5Ge_1Mn_\delta$, respectively.

Figure 11:
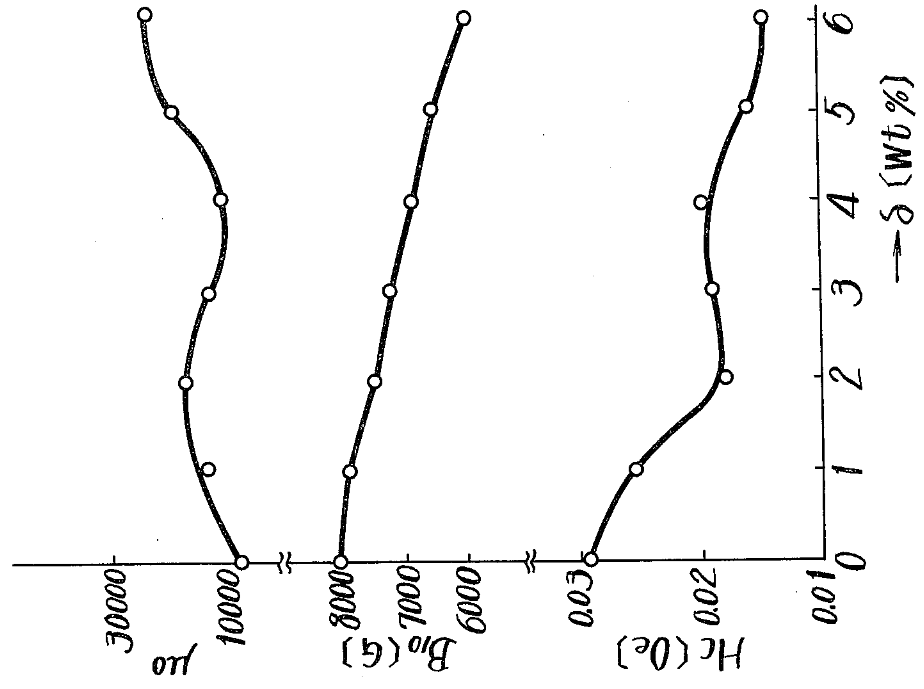
FIG. 11 is a graph showing static magnetic characteristics of a quadruple alloy $Ni_{80}Fe_{16-\delta}Cr_4Ge_0Mn_\delta$.
Figure 10:
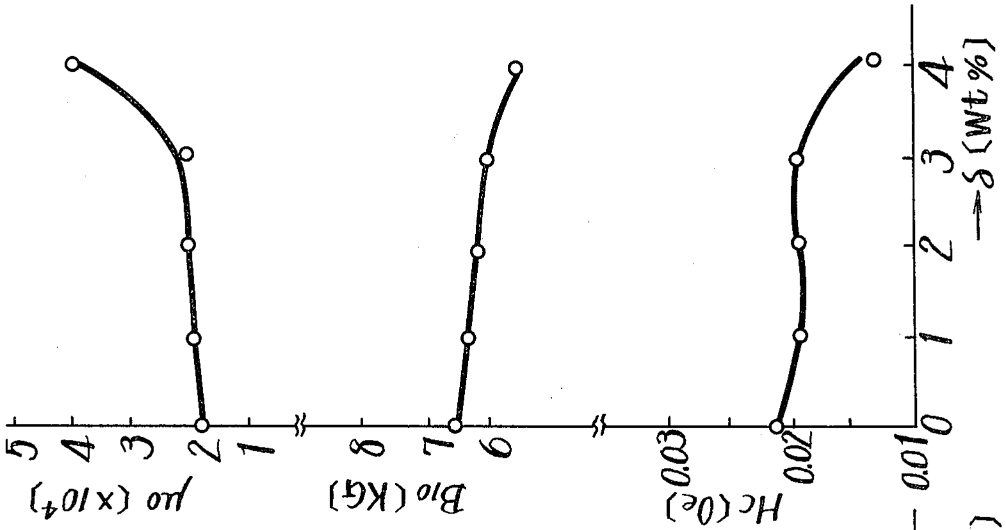
FIG. 10 is a graph showing static magnetic characteristics of a quintuple alloy $Ni_{80}Fe_{14-\delta}Cr_5Ge_1Mn_\delta$.
Figure 9:
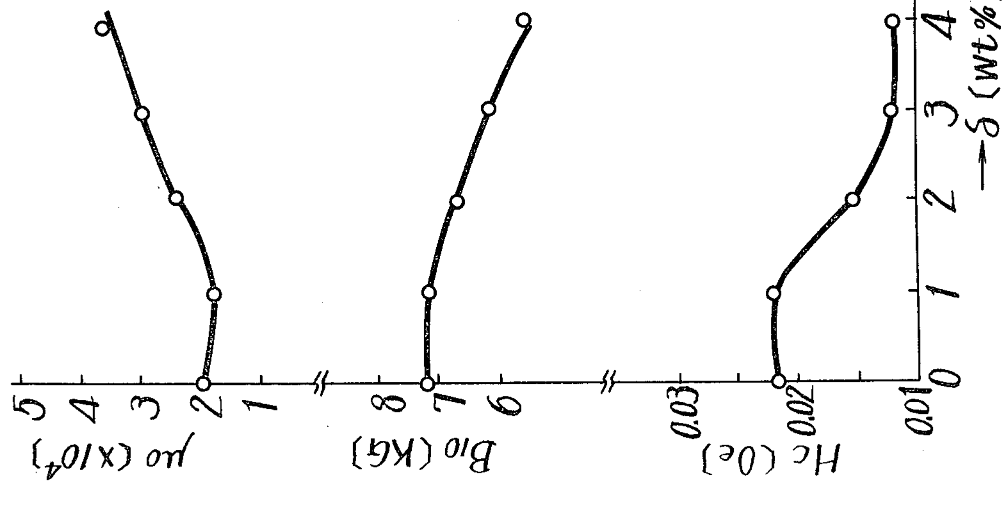
FIG. 9 is a graph showing static magnetic characteristics of a quintuple alloy $Ni_{80}Fe_{14.5-\delta}Cr_5Ge_{0.5}Mn_\delta$.

FIG. 11 is a graph showing above three magnetic characteristics, Hc, $B_{10}$ and $\mu_0$ of a quadruple magnetic alloy $Ni_{80}Fe_{16-\delta}Cr_4Ge_0Mn_\delta$ (which does not contain germanium).

The next table I shows effective permeability of typical compositions of this invention, comparative composition which does not contain Ge and prior art Permalloy, measured at the frequency 1 KHz, 10 KHz, 100 KHz.

Table I

| Example | Composition | Effective permiability 1 KHz | 10 KHz | 100 KHz |
|---|---|---|---|---|
| 1 | $80Ni4Cr_{2.5}Ge1.9Mn11.6Fe$ | 40000 | 7350 | 1440 |
| 2 | $80Ni4Cr_{1.25}Ge0.9Mn13.85Fe$ | 37200 | 6550 | 1350 |
| 3 | 80Ni4Cr0.9Mn15.1Fe (not containing Ge) | 30500 | 5880 | 1270 |
| 4 | $81Ni4Cr_{2.5}Ge1.9Mn10.6Fe$ | 34200 | 6800 | 1400 |
| 5 | 80Ni5Mo15Fe | 28200 | 4770 | 950 |

In the table I, Examples 1, 2, and 4 are the compositions of this invention.

As may be apparent from FIGS. 1 to 11 and Table I, the static and dynamic magnetic characteristics, specific resistance, hardness and so on of the quintuple alloy NiFeCrGeMn according to this invention depend upon the composition rate thereof.

As to the static magnetic characteristics, if the amount of Ni is selected low or 75 weight percents, the coercive force Hc especially increases, but the initial permeability $\mu_0$ decreases to deteriorate the magnetic characteristics as a whole, as shown in FIGS. 1 and 2. As shown in FIGS. 3 or 4 and FIG. 5, if the adding amount of Ni is selected high or 80 or 85 weight percents, the coercive force Hc decreases, but the initial permeability $\mu_0$ increases to improve the magnetic characteristics as a whole.

FIGS. 1 and 4 are the graphs showing the magnetic characteristics of the alloys subjected to the furnace cooling treatment at the final annealing which is desired from a practical point of view, but FIGS. 2 and 5 are the graphs showing the magnetic characteristics of the alloys subjected to the rapid cooling treatment which generally avoids the formation of magnetic anisotropy. As may be apparent from FIGS. 1, 2, 4 and 5, if Cr is added more than by weight percent of 2 to 3, the coercive force Hc decreases and the formation of magnetic anisotropy is avoided irrespective of the furnace cooling treatment and rapid cooling treatment. Accordingly, the magnetic material of this invention can be finally annealed by the furnace cooling which is easy in heat treatment.

As to the specific resistance, it may be obvious from FIGS. 1 and 4 that the proper resistance increases in accordance with the addition of Cr to thereby decrease the eddy current loss of the magnetic material.

As to the hardness, it may be obvious from the Vicker's hardness shown in FIG. 2 that the hardness becomes high by the addition of Ge and Cr, respectively. And also, it is noted that the magneto-striction and magnetic anisotropy decrease and the reproduceability of magnetic characteristics is improved by addition of Ge.

Further, as shown in the Table I, the effective permeability increases in accordance with the addition of germanium (Ge).

The composition, which has good magnetic characteristics exists at the side where Ge is added about 0.5 weight percents and at the side where Cr is added large (4 to 5 weight percents) as shown in FIG. 3. In this case, it is noted that the former is high in magnetic flux density and hardness, and the latter is improved in wear resistance by addition of Cr.

Referring now to FIGS. 6 to 11, by adding Mn to the quadruple alloy NiFeCrGe, the coercive force Hc further decreases but the initial permeability $\mu_0$ increases to improve the magnetic characteristics, on account of deoxidation effect of Mn. Further the rolling property of the magnetic material is improved by adding Mn thereto.

It is desired as a magnetic material used for a magnetic head that its coercive force Hc is in the vicinity of 0.07 oersteds or smaller than it, its magnetic flux density $B_{10}$ is more than 6000 Gausses, its initial permeability $\mu_0$ is greater than 4000 and its specific resistance $\rho$ is greater than 60 $\mu\Omega$-cm.

If the foregoing is taken in account, it is preferred in this invention that in the quintuple alloy NiFeCrGeMn the amount of Ni is selected 79 to 85 weight percents and that of Cr 2 to 6 weight percents, respectively. When the adding amount of Cr is smaller than 2 weight percents, the coercive force Hc increases and the wear resistance is deteriorated, while when greater than 6 weight percents, the magnetic flux density $B_{10}$ is deteriorated.

The adding amount of Ge is preferred to be selected in the range of 0.01 to 5 weight percents. When the adding amount of Ge is selected smaller than 0.01 weight percent, the improved characteristics in effective permeability can't be obtained, while when greater than 5 percents, the coercive force Hc increases and Ge is deposited instead of being replaced. The adding amount of Mn is preferred to be in the range of 0.5 to 6 weight percents. When the adding amount of Mn is greater than 6 weight percents, the magnetic flux density $B_{10}$ is deteriorated and magnetic anisotropy becomes great, while when smaller than 0.5 weight percents, improved characteristics in permeability and coercive force can't be obtained.

Further, it is desired as a magnetic material used for magnetic head which is passed by the magnetic tape using $CrO_2$ as magnetic powder, that the material should have magnetic flux density $B_{10}$ greater than 6400 Gausses to avoid the head core being saturated by the high coercive force of $CrO_2$. If the foregoing is taken in account, it is preferred in this invention that in the quintuple alloy NiFeCrGeMn, the amount of Ni should be selected 79 to 85 weight percent, that of Cr 3 to 6 weight percent, that of Ge 0.01 to 1 weight percent, and that of Mn 0.8~6 weight percent, respectively.

Figure 12:
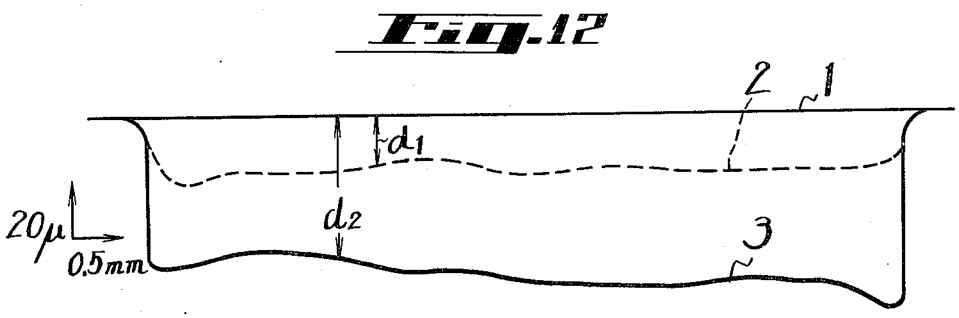
FIGS. 12, 13 and 14 are diagrams showing the results of abrasion tests of the magnetic materials according to the present invention and a prior art Permalloy.
Figure 13:
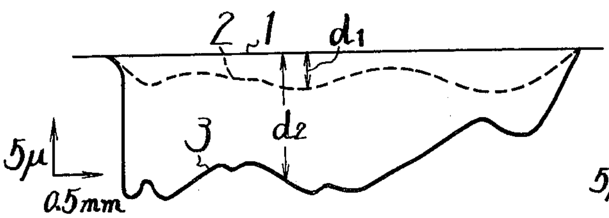
Figure 14:
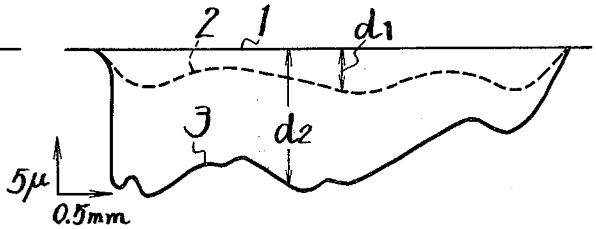

FIGS. 12 and 13 are diagrams showing the results of abrasion tests of the typical composition of the invention, that is, the quintuple alloy $Ni_{80}Fe_{10}Cr_{5.5}Ge_2Mn_{2.5}$ as compared with the prior art Permalloy. FIG. 12 shows abraded amounts $d_1$ and $d_2$ of dummy cores, which are formed by laminating a plurality of cores each with thickness of 0.145 mm, when an ordinary magnetic tape is travelled in contact with the dummy cores at a speed of 19cm/sec for 234 hours (where the magnetic tape is replaced with a new one at every 50 hours). In FIG. 12 reference numeral 1 designates a contact surface of the dummy core with which the tape does not yet contact or reference surface, reference numeral 2 an abraded contact surface of the dummy cores formed of the magnetic material of this invention after tests, and reference numeral 3 an abraded contact surface of the dummy core formed of the prior art Permalloy after tests. FIG. 13 shows abraded amounts $d_1$ and $d_2$ of dummy cores which are formed by laminating a plurality cores each having a thickness of 0.10mm, when a cassette tape is travelled in contact with the dummy cores at a speed of 4.8cm/sec for 150 hours (the cassette tape is replaced by new one at every 50 hours). FIG. 14 shows results of abrasion test of another typical composition of the invention, that is, $Ni_{80}Fe_{11}Cr_5Ge_{0.5}Mn_3$ as compared with the prior art Permalloy, tested in the same condition as case of FIG. 13. In FIGS. 13 and 14, reference numerals corresponding to those used in FIG. 12 indicate the corresponding surfaces, respectively. From FIGS. 12, 13 and it will be apparent that the magnetic material according to this invention is superior in wear resistance.

Figure 15:
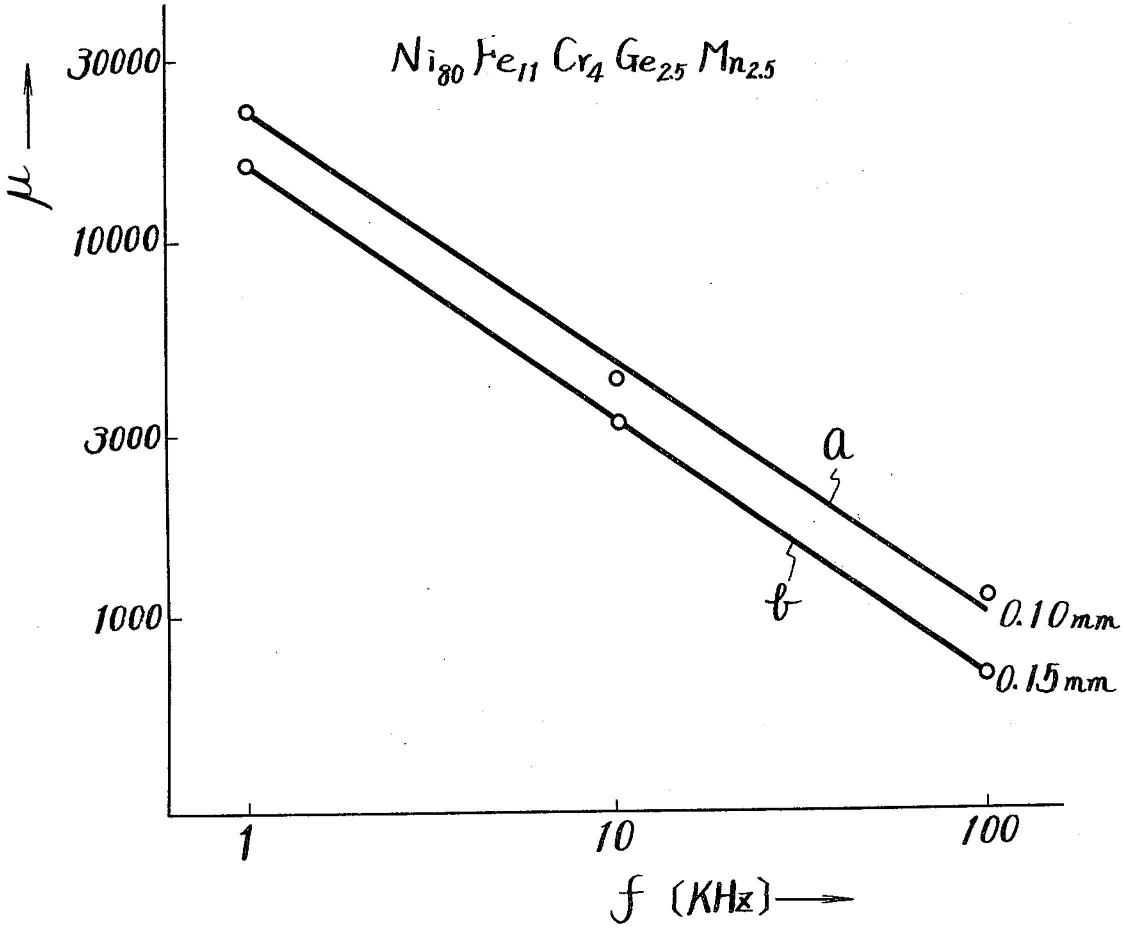
FIG. 15 is a graph showing the permeability frequency characteristics of the magnetic material of this invention.

FIG. 15 is a graph showing the permeability-frequency characteristics of the typical composition of this invention or quintuple alloy $Ni_{80}Fe_{11}Cr_4Ge_{2.5}Mn_{2.5}$ in a thin plate in which the ordinate represents the permeability $\mu$ and the abscissa the frequency $f$ in KHz, respectively. From the graph of FIG. 15, it will be noted that the permeability-frequency characteristics are superior, and the magnetorestriction and the magnetic anisotropy are both small. In FIG. 15, a line $a$ shows the frequency characteristic of the magnetic material in the form of a thin plate with a thickness of 0.10mm and a line $b$ that with a thickness of 0.15mm.

As may be apparent from the above description, according to this invention there is obtained the magnetic material, which is superior in static magnetic characteristics and wear resistance and has high proper resistance, and also is easy in rolling, so that the magnetic material of this invention is effective for use with a magnetic recording and reproducing head for a magnetic tape with chromium dioxide ($CrO_2$) and with high coercive force or for use with a shield case.

It will be apparent that many modifications and variations could be made by those skilled in the art without departing from the spirit and scope of the novel concepts of this invention.

I claim as my invention:

1. A magnetic alloy consisting essentially of, on a 100 weight percent basis, between 79 and 85 weight percent nickel; between 3 and 6 weight percent chromium; between 0.01 and 1 weight percent germanium; between 0.8 and 6 weight percent manganese; and at least 9 weight percent iron, said alloy being characterized by having a coercive force not larger than 0.07 oersteds, a magnetic flux density greater than 6400 Gausses, an intial permeability greater than 4,000 and a specific resistance greater than 60$\mu\Omega$-cm.

* * * * *